Aug. 25, 1925.
J. H. WAGENHORST
WHEEL RIM
Filed April 2, 1921
1,551,445
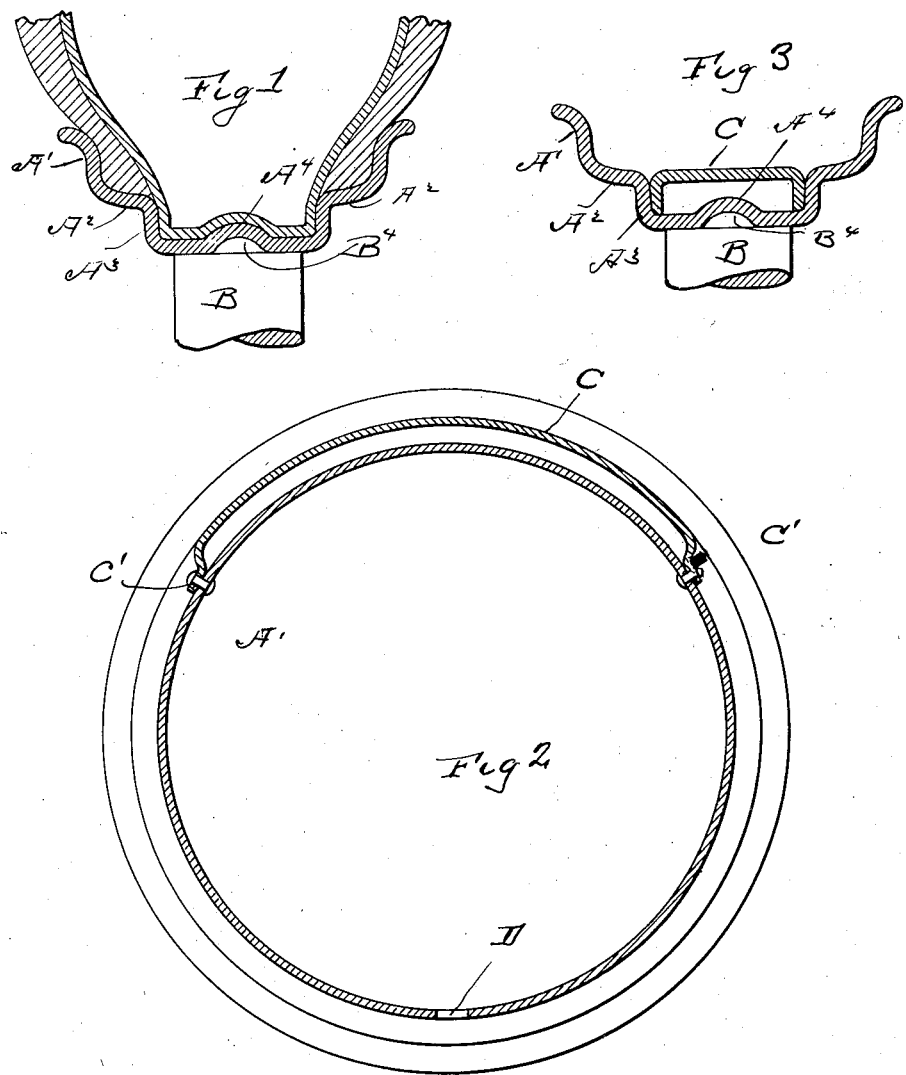
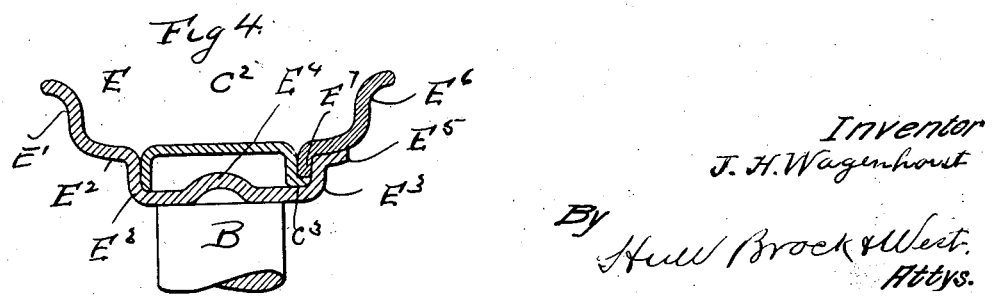
Inventor
J. H. Wagenhorst
By Hull Brock & West
Attys.

Patented Aug. 25, 1925.

1,551,445

UNITED STATES PATENT OFFICE.

JAMES H. WAGENHORST, OF JACKSON, MICHIGAN.

WHEEL RIM.

Application filed April 2, 1921. Serial No. 458,003.

*To all whom it may concern:*

Be it known that I, JAMES H. WAGENHORST, a citizen of the United States, residing at Jackson, in the county of Jackson and State of Michigan, have invented a certain new and useful Improvement in Wheel Rims, of which the following is a full, clear, and exact description, reference being had to the accompanying drawings.

This invention relates generally to automobile wheels and more particularly to a novel type of rim which is intended to be applied directly to the ends of the spokes and which will receive and carry a straight side tire.

One of the objects of the invention is to provide means to facilitate the removal of the tire from the rim without injury to the inner tube of the tire. Another object of the invention is to provide a rim of this character which can be used in connection with a detachable tire engaging flange or ring usable in connection with the tire carrying rim which is applied directly to the ends of the spokes.

With these various objects in view the invention consists in the novel features of construction hereinafter fully described and pointed out in the appended claims.

In the drawings forming a part of this specification Fig. 1 is a transverse sectional view of a rim constructed in accordance with my invention and having a tire applied thereto; Fig. 2 is a longitudinal sectional view of said rim; Fig. 3 is a transverse section on the line 3—3 of Fig. 2; Fig. 4 is a transverse sectional view showing a slight modification.

Referring to the drawings A indicates the tire carrying rim and spokes constituting the wheel. The rim is rolled from sheet metal and is in the form of an unbroken circle. In rolling the rim I provide the side flanges A' which are shaped to engage the beads of a straight side tire and the side flanges A' are bent toward each other as shown at A² to provide a base upon which the bead seats. Between the base portions A² the central portion of the rim is pressed inwardly as shown at A³ providing a central inwardly projecting portion of sufficient width and depth to permit one of the beads of the shoe to be pressed down into the same at one side so as to permit the shoe at the opposite side to be lifted clear of the rim. This central inwardly projecting portion of the rim is formed with outwardly projecting sockets A⁴ into which fits the tenon B⁴ formed upon the end of the spoke. The inner tube of the tire will rest in the central inwardly projecting portion of the rim and the internal pressure of the tire will hold the beads of the shoe firmly in place against the portions A² and A'. As before stated this central inwardly projecting portion A³ is provided to permit the bead of the shoe at one side to be pushed into the same after the tire has been deflated. In order to remove the shoe from the opposite side of the rim and in order to provide against injury to the inner tube when a screw driver or tire tool is inserted between the rim and bead I employ a filler C preferably in the form of a strip of channel iron inserted in the base of the rim directly opposite the valve stem hole D, said filler being secured at its ends to the base of the rim as most clearly shown at C'. In practice I prefer to extend this filler about one-third of the circumference of the rim. In Fig. 4 I have shown a slight modification of the rim E which is made with one permanent flange E' and base portion E² and the inwardly projecting portion E³, said inwardly projecting portion having outwardly extending sockets E⁴ exactly the same as previously described and the wooden spokes B will also be formed with the tenon B⁴ to fit in said sockets. The outer side of the rim is formed with an outwardly projecting flange E⁵ and resting upon this flange E⁵ is the detachable flange ring E⁶, the inner edge thereof E⁷ extending into the central inwardly projecting portion of the rim and the filler C² is formed with an outwardly projecting toe piece C³ against which the inwardly extending edge E⁷ of the ring E⁶ contacts. In case any fastening means are required to retain the detachable flange E⁶ in place, they may be provided.

It is obvious that by removing the detachable flange ring E⁶ the tire can be quickly and easily removed from the rim.

By rolling the rim in the shape herein shown and described it is obvious that I provide an exceedingly light rim and at the same time one which will have great strength, owing to the central inwardly projecting portion and the angles formed between said portion and the tire retaining flanges. It will also be seen that by means of the sheet metal filler I provide against injury to the inner tube, while removing the tire through the medium of a tool, and that the said filler while being exceedingly light also adds considerable strength to the rim as a whole.

With a drop base rim in which the inner tube projects into the dropped portion of the base, the insertion of a screw driver or tire tool under the bead of the tire, as is frequently done in removing the tire from the rim, might easily result in the operator punching a hole through the side of the inner tube. This is prevented by reason of the filler C which supports a portion of the inner tube opposite the valve stem in substantial alinement with the beads of the tire, so that, when a tire tool is inserted under the bead at these points, it will slide under the inner tube without puncturing it.

Having thus described my invention, what I claim is:

1. A tire carrying rim adapted to receive a tire having an inextensible bead and comprising tire retaining flanges and a central inwardly extending portion, and a filler arranged in said inwardly projecting portion at a point removed from the valve stem hole.

2. A tire carrying rim adapted to receive a tire having an inextensible bead and comprising an outwardly extending tire retaining flange at one side and a ring receiving flange at the opposite side and a central inwardly projecting portion, a filler arranged in said inwardly projecting portion, and a detachable tire engaging flange having its inner edge extending inwardly into the central inwardly projecting portion and engaging the filler arranged in said portion.

3. A rim having an inwardly projecting base portion and oppositely disposed bead seating portions, and means arranged within the inwardly projecting portion of the base to maintain a portion of the inner tube of a tire in substantial alignment with the bead seating portions of the rim base and whereby a tire tool can be introduced beneath the bead of said portion and an inner tube without injury to said tube.

4. A rim having an inwardly extending base portion and bead seating portions upon opposite sides of said inwardly extending portion, and means within said inwardly extending portion for maintaining the contacting portion of an inner tube of a tire substantially in alignment with the bead seating portions of the rim whereby a tire tool may be introduced between that portion of the inner tube and said means without injury to the inner tube.

5. A rim having oppositely disposed seats for the beads of a tire and an inwardly projecting portion intermediate said seats and adapted to receive portions of an inner tube, said intermediate portion being provided with means for holding a portion of said inner tube substantially in alignment with the adjacent seat portions whereby a tool may be introduced beneath the bead and inner tube without damage to said inner tube.

6. A tire carrying rim having oppositely disposed bead seating portions and a central inwardly projecting portion, said inwardly projecting portion being adapted to receive a portion of the inner tube of said tire, and a filler member connected to the rim within the central inwardly projecting portion, the central portion of said filler member being substantially in alignment with the adjacent bead seating portions of the rim.

7. A tire carrying rim having oppositely disposed bead seating portions and a central inwardly projecting portion and a filler member connected to the rim at its ends within the inwardly projecting portion, said filler member consisting of a curved plate the central portion of which is substantially in alignment with the adjacent bead seating portion of the rim.

In testimony whereof, I hereunto affix my signature.

JAMES H. WAGENHORST.